March 1, 1938.  E. P. CORBIN  2,109,956
BELT CENTERING DEVICE
Filed Dec. 5, 1935  2 Sheets-Sheet 1
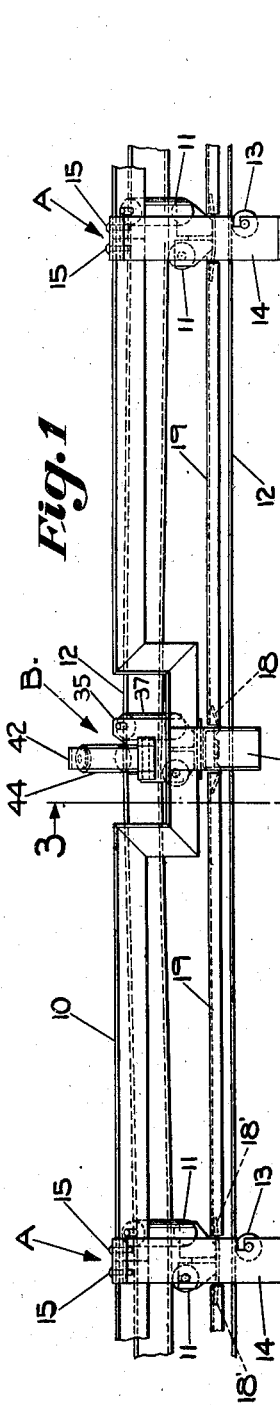
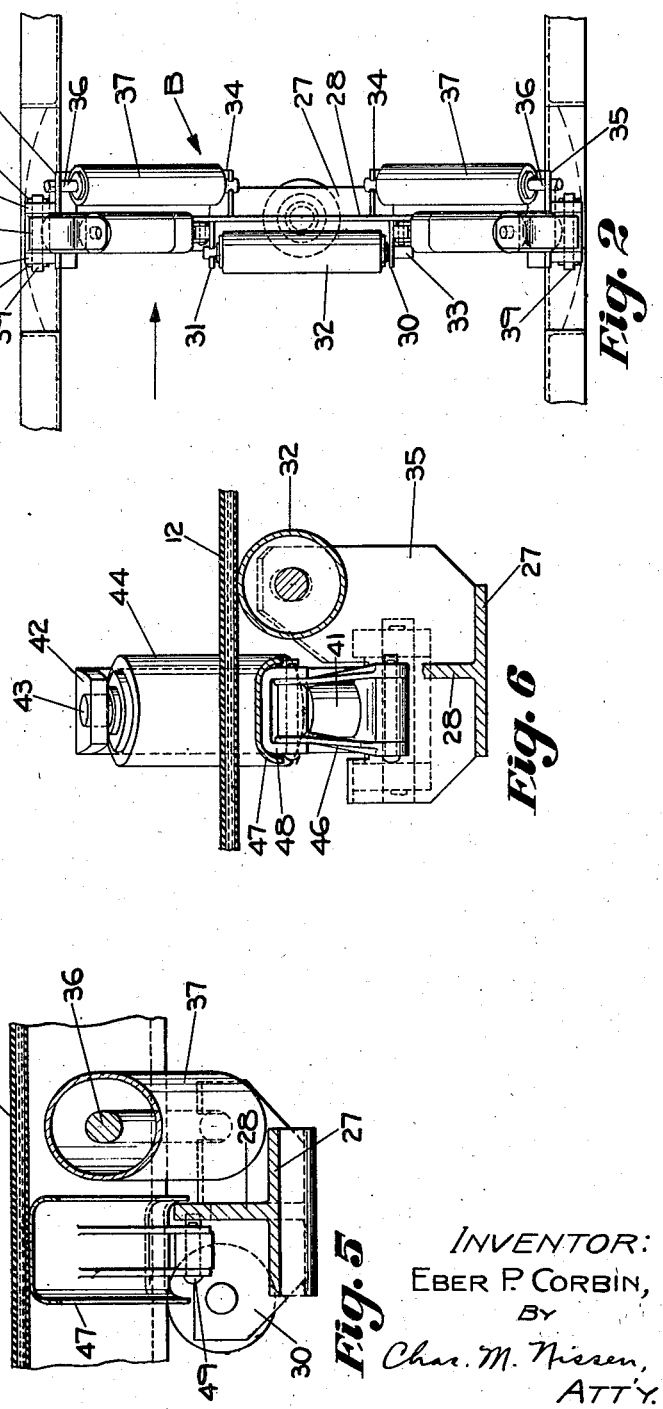
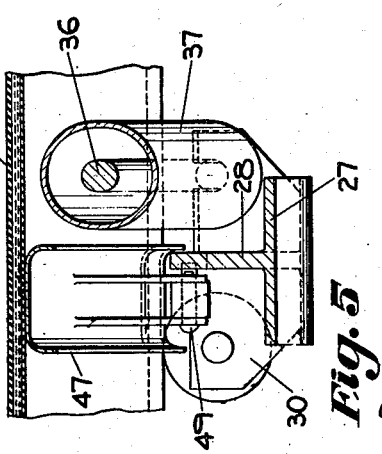
INVENTOR:
EBER P. CORBIN,
BY
Chas. M. Nissen,
ATTY.

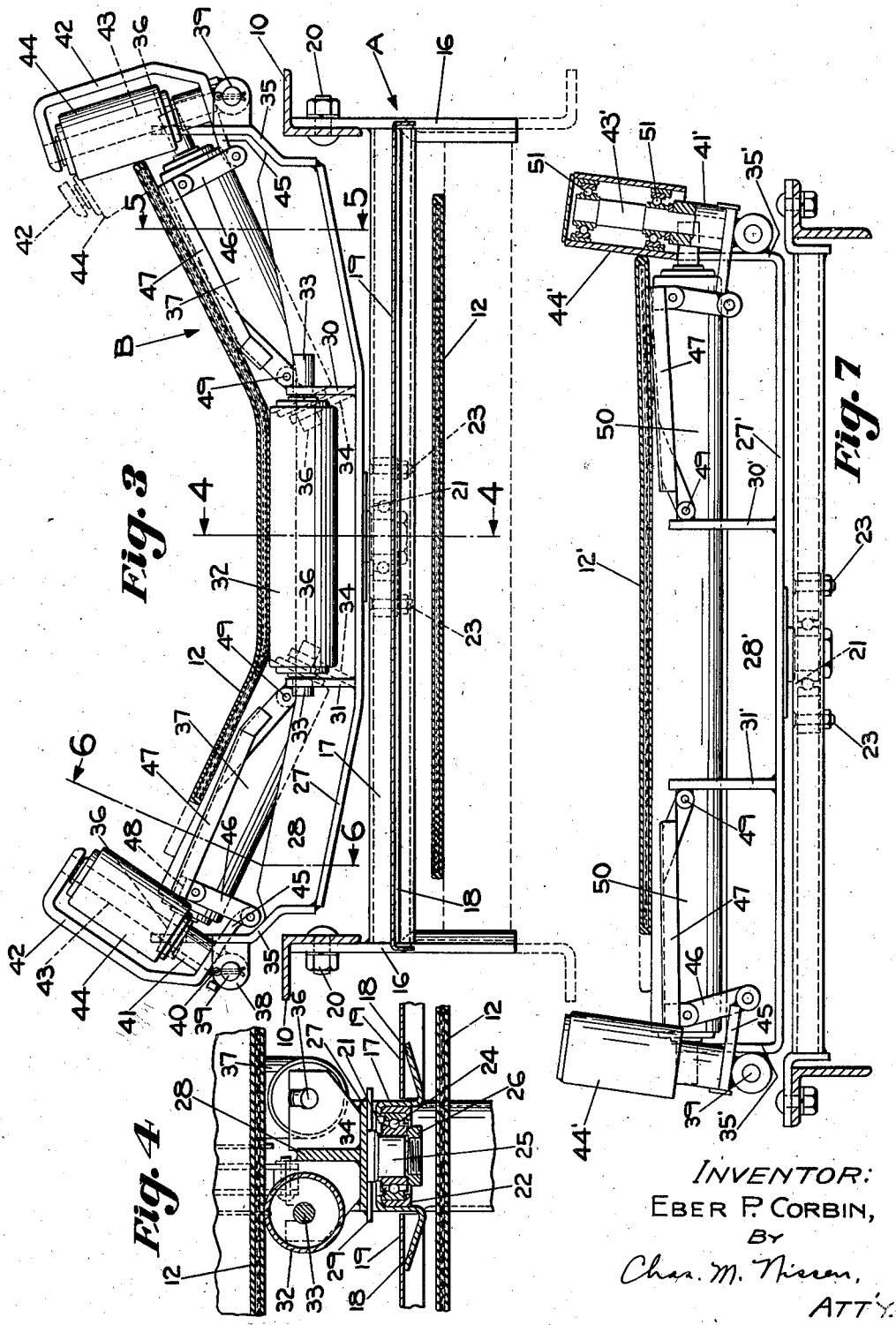

Patented Mar. 1, 1938

2,109,956

UNITED STATES PATENT OFFICE 2,109,956

BELT CENTERING DEVICE

Eber P. Corbin, Columbus, Ohio, assignor to The Jeffrey Manufacturing Company, a corporation of Ohio Application December 5, 1935, Serial No. 53,055

16 Claims. (Cl. 198—202)

This invention relates to a belt centering device of the automatic type. An object of the invention is to provide a device of the above described class which will operate automatically to align a belt or to bring it to its central position with respect to belt idlers, in which an adjustable shoe is provided to make a friction contact with a portion of the belt thereby to swing an idler supporting frame about an upright axis to align the belt without in any way altering the normal operation of the belt supporting idler rollers.

Other objects of the invention will appear hereinafter, the novel features and combinations being set forth in the appended claims.

In the accompanying drawings,

Fig. 1 is a side elevational view of a belt conveyor including the belt centering device comprising my invention;

Fig. 2 is a plan view of the belt centering device shown at the center of Fig. 1;

Fig. 3 is a sectional view taken on the line 3—3 of Fig. 1 looking in the direction of the arrows showing the belt centering device in elevation;

Fig. 4 is a sectional view taken on the line 4—4 of Fig. 3 looking in the direction of the arrows;

Fig. 5 is a sectional view taken on the line 5—5 of Fig. 3;

Fig. 6 is a sectional view taken on the line 6—6 of Fig. 3; and

Fig. 7 is an elevational view of a modified form of a belt centering device comprising my invention.

Referring particularly to the drawings, there is seen a belt conveyor comprising spaced apart chairs A which are connected together by longitudinally extending angle members 10, 10. The angle members 10, 10 are dished or dropped adjacent their centers and support a belt centering device B comprising my invention.

It may be pointed out that the spaced apart chairs A carry appropriate idler rollers 11 which form the upper run of a belt 12 into a trough. A single roller 13 may be provided for supporting the lower run of the belt 12. The rollers 11 and 13 may be carried between spaced side plates 14. The angle members 10, 10 may be removably attached to the side plates of the chairs A as by pins 15, 15.

The belt centering device B comprises a pair of spaced apart side plates 16, 16 which may be rigidly attached together by a transversely extending crosspiece 17 which may be in the form of an inverted U having wings 18, 18. Spill plates 19 may be provided which extend between the chairs A and the belt centering device B, and are supported upon the wings 18, 18 of the latter and corresponding wings 18', 18', on the chairs. It is to be noted that the side plates 16, 16 are removably attached to the angle members 10, 10 as by nuts and bolts 20, 20.

Midway between the two side plates 16, 16 the crosspiece 17 is provided with an aperture 21 below which is positioned a cup 22, removably attached to said crosspiece 17 as by nuts and bolts 23, 23. The cup 22 carries a ball-bearing 24, the inner race of which is rigidly attached to an upright shaft 25 by a nut 26. Rigidly attached to the upper portion of the shaft 25 is a swingable belt idler supporting frame formed by a plate 27 having an upstanding web 28 substantially intermediate the edges thereof. A ring shaped washer 29 is attached to the plate 27 on the lower side thereof surrounding the shaft 25. Extending from one side of the web 28 and carried on the plate 27 is a pair of brackets 30 and 31 which are adapted to support a horizontal roller 32. It is to be noted that the bracket 30 is provided with an aperture adapted to receive one end of shaft 33 of roller 32 while the bracket 31 is provided with a slot adapted to receive the other end of shaft 33, which end is milled to have flat sides adapted to fit closely into said slot thereby preventing rotation of said shaft 33, but permitting free removal of the roller 32 without requiring the use of any tools.

On the other side of the web 28 and carried on the plate 27 in approximate alignment with the brackets 30 and 31 are a pair of inclined brackets 34, 34 which are also provided with slots. The outer ends of the plate 27 and the web 28 have rigidly attached to them a pair of upstanding brackets 35, 35. These brackets are provided with apertures adapted to receive and support the elevated ends of shafts 36, 36 of inclined outer idler rollers 37, 37. It will be evident that each of said idler rollers 37, 37 will be supported by one of said brackets 35, 35 and one of said brackets 34, 34. It will also be evident that these idler rollers may be readily removed without requiring the use of any tools.

Adjacent each end of the pivoted frame, which includes the plate 27, there is an automatic belt centering device; these devices being similar, one being operative to center the belt should it move to one side of the device and the other being operative to center it should it move to the other side thereof. As the devices are similar, the description of one will suffice for both.

Mounted on bracket 35 and extending outwardly therefrom is a pair of spaced arms 38, 38 (see Fig. 2), between which extend a shaft 39 held in position by cotter pins 40, 40. Journaled on the shaft 39 is a hub 41 to which is attached a U shaped yoke 42. Extending between the hub 41 and the free end of the yoke 42 is a shaft 43 upon which is journaled an end roller 44. It may be mentioned that in normal operation the end roller 44 does not rotate as it is out of contact with the belt 12. The yoke 42 has an integral inwardly extending lever 45 adjacent the bottom thereof, to which is pivoted a link 46. Said link 46 is in turn pivoted to one end of a friction shoe 47 through the intermediary of a bracket 48 (see Fig. 6). The other end of the friction shoe 47 is pivoted to the bracket 30 or 31, previously described, by means of a pivot and pin construction 49, best seen in Fig. 5 of the drawings.

In the operation of the device it is intended that the belt assume a central position with respect to the belt centering device. However, should the belt move to one side, as illustrated in full lines in Fig. 3, the edge thereof will contact an end roller 44 and pivot it about the shaft 39. This pivoting will, of course, also pivot the yoke 42, and through the lever 45 and link 46 will pivot the shoe 47 about its pivot 49. This will elevate the shoe 47 from its normal running position, as illustrated in Fig. 6, to the position illustrated in Fig. 5 in which the shoe will have frictional engagement with the under side of the upper run of the belt 12 whereby the pivotal frame, including the plate 27, will pivot about the axis of the shaft 25. As a consequence, the idlers 37, 32, 37 will be skewed to such angular positions that the belt will be directed back towards its central position and the pivoted frame will likewise assume a central position. It is thus evident that a device has been provided which will automatically maintain a belt in proper alignment.

In Fig. 7 I have illustrated for a flat belt in a horizontal plane without troughing, a modified form of my invention which operates on the same principle as the construction disclosed in Figs. 1 to 6, inclusive. In this modified device a single flat idler roller 50 is employed and mounted on one side of web 28' with the friction means 47 on the other side thereof, or a plurality of idlers or rollers may be employed and mounted on spaced horizontal transverse axes, the center roller having its axis on one side of the web 28', the axes of the two outer rollers being on the other side of the web 28'. If a single roller 50 is employed it will be supported on brackets 35', while if a plurality of rollers are employed, brackets 30', 31' and 35' will then be provided for supporting the rollers and for supporting the brake mechanism as shown in Fig. 7.

There is another difference in the device here disclosed in that there is no counterpart for the yoke 42 of the previously described device. In lieu thereof I provide a shaft 43' rigidly attached to a hub 41' upon which shaft 43' the end roller 44' is mounted as by ball-bearings 51, 51. It is to be distinctly understood that this construction of the end roller and support therefor may be employed in the device illustrated in Figs. 1 to 6, inclusive. Except for those differences above enumerated, the device of Fig. 7 follows the disclosure of the devices of Figs. 1 to 6, inclusive. It will be evident that the device of Fig. 7 is operative to center the belt 12' automatically should it move from its normal central position in the same manner in which belt 12 of the device of Figs. 1 to 6, inclusive is operative.

The device of Fig. 7 may be used for the lower run or for the upper run when the latter is not troughed.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a belt centering device, the combination with a base frame, of a belt idler roller supporting frame pivoted to said base frame for free swinging movement, belt supporting idlers carried by said supporting frame, normally non-operating upright end rollers carried on said supporting frame, said end rollers being carried on pivoted upright shafts, and friction shoes controlled by said end rollers, said shoes operating responsive to the pivoting of said end rollers when contacted by the belt to contact said belt and cause pivotal movement of said supporting frame thereby to bring said belt into proper alignment.

2. In a belt centering device, the combination with a base frame, of a belt idler roller supporting frame pivoted to said base frame for free swinging movement, belt supporting idlers carried by said supporting frame, end rollers carried on said supporting frame, said end rollers being carried on pivoted upright shafts, and friction shoes controlled by said end rollers, said shoes operating responsive to the pivoting of said end rollers when contacted by the belt to contact said belt and cause pivotal movement of said supporting frame thereby to bring said belt into proper alignment.

3. In a belt centering device, the combination with a base frame, of a belt centering and supporting frame pivoted to said base frame for free swinging movement, belt supporting means carried by said supporting frame, and pivoted friction means constructed and arranged to pivot and engage the belt when it becomes out of alignment thereby to realign it by swinging of said supporting frame.

4. In a belt centering device, the combination with a base frame, of a belt idler roller supporting frame pivoted to said base frame for free swinging movement, belt idler supporting brackets on said supporting frame, belt idlers on said brackets, normally non-operating pivoted end rollers carried on the ends of said supporting frame, friction shoes pivoted at one end to said idler supporting brackets and at the other end to means attached to the shafts of said end rollers, said means effecting engagement between said friction shoes and the belt when said end rollers are pivoted about their pivot due to misalignment of said belt thereby to swing said supporting frame and realign said belt.

5. In a belt centering device, the combination with a base frame, of a belt idler roller supporting frame pivoted to said base frame for free swinging movement, belt idler supporting brackets on said supporting frame, belt idlers on said brackets, pivoted end rollers carried on the ends of said supporting frame, friction shoes pivoted at one end to said idler supporting brackets and at the other end to means attached to the shafts of said end rollers, said means effecting engagement between said friction shoes and the belt when said end rollers are pivoted about their pivot due to misalignment of said belt thereby to swing said supporting frame and realign said belt.

6. In a belt centering device, the combination with a base frame, of a belt idler roller supporting frame pivoted to said base frame for free swinging movement, belt idler supporting brackets on said supporting frame, belt idlers on said brackets, pivoted end rollers carried on the ends of said supporting frame, friction shoes pivoted at one end to said idler supporting brackets and at the other end to means attached to the shafts of said end rollers, said means effecting engagement between said friction shoes and the belt when said end rollers are pivoted about their pivot due to misalignment of said belt thereby to swing said supporting frame and realign said belt, said end rollers being mounted on a shaft carried between the ends of a yoke.

7. In a belt centering device, the combination with a base frame, of a belt idler roller supporting frame pivoted to said base frame for free swinging movement, belt idler supporting brackets on said supporting frame, belt idlers on said brackets, pivoted end rollers carried on the ends of said supporting frame, friction shoes pivoted at one end to said idler supporting brackets and at the other end to means attached to the shafts of said end rollers, said means effecting engagement between said friction shoes and the belt when said end rollers are pivoted about their pivot due to misalignment of said belt thereby to swing said supporting frame and realign said belt, said end rollers being carried on a shaft held rigid in a hub and being free of any surrounding supporting means.

8. In a belt centering device, the combination with a base frame, of a belt idler roller supporting frame pivoted to said base frame for free swinging movement, belt supporting idlers carried by said supporting frame, end rollers carried on said supporting frame, said end rollers being carried on pivoted upright shafts, and friction shoes controlled by said end rollers, said shoes operating responsive to the pivoting of said end rollers when contacted by the belt to contact said belt and cause pivotal movement of said supporting frame thereby to bring said belt into proper alignment, said upright shafts being free of direct support at their upper ends.

9. In a belt centering device, the combination with a base frame, of a belt idler roller supporting frame pivoted to said base frame for free swinging movement, belt supporting idlers carried by said supporting frame, end rollers carried on said supporting frame, said end rollers being carried on pivoted upright shafts, and friction shoes controlled by said end rollers, said shoes operating responsive to the pivoting of said end rollers when contacted by the belt to contact said belt and cause pivotal movement of said supporting frame thereby to bring said belt into proper alignment, said upright shafts being supported at their upper ends by a yoke.

10. In a belt centering device, the combination with a base frame, of a belt centering and supporting frame pivoted to said base frame for free swinging movement, belt supporting means carried by said supporting frame constructed and arranged to maintain said belt flat, and pivoted friction means constructed and arranged to pivot and thereby engage the belt when it becomes out of alignment thereby to realign it by swinging of said supporting frame.

11. In a belt centering device, the combination with a base frame, of a belt centering and supporting frame pivoted to said base frame for free swinging movement, troughing belt supporting means carried by said supporting frame comprising a plurality of rollers the axes of which are in spaced apart parallel planes whereby the entire lower area of the upper run of a belt is supported, and friction means operable by misalignment of said belt to swing said supporting frame to realign said belt, said friction means including pivoted belt engaging shoes.

12. In a conveyor, the combination with a frame comprising longitudinally extending spaced frame members having dropped portions intermediate their ends, of belt centering means carried by said frame members in the dropped portions thereof.

13. In a belt centering device, the combination with a base frame, of a belt supporting frame pivoted thereto for swinging movement, friction shoes adjustably mounted on said belt supporting frame and operative to contact the belt carried by said device and swing said belt supporting frame to belt aligning position, and means constructed and arranged to operate said friction shoes as aforesaid upon said belt becoming misaligned.

14. In a belt centering device, the combination with a base frame, of a belt supporting frame pivoted thereto for swinging movement, means comprising friction shoes pivotally attached to said belt supporting frame and operative to contact the belt carried by said device to swing said belt supporting frame to belt aligning position, and belt contactible means constructed and arranged to pivot said friction shoes about their pivots to contact said belt as aforesaid, said means being operable when contacted by said belt when misaligned.

15. In a conveyor, the combination with a frame comprising longitudinally extending spaced side members having dropped portions intermediate their ends, means for supporting said side members at their ends, belt centering means carried by said side members at said dropped portions comprising a transversely extending member attached at opposite ends to the dropped portions of said side members, a swinging frame mounted on said transversely extending member for swinging movement about an upright axis, and belt supporting idlers on said swinging frame, the longitudinal extremities of said dropped portions acting as stops to restrict the swinging movement of said swinging frame.

16. In a conveyor, the combination with a frame comprising longitudinally extending spaced side members having dropped portions intermediate their ends, means for supporting said side members at their ends, belt centering means carried by said side members at said dropped portions comprising a transversely extending member attached at opposite ends to the dropped portions of said side members, a swinging frame mounted on said transversely extending member for swinging movement about an upright axis, and belt supporting idlers on said swinging frame.

EBER P. CORBIN.